United States Patent [19]

Lahmi

[11] Patent Number: 5,982,956
[45] Date of Patent: Nov. 9, 1999

[54] SECURE METHOD FOR DUPLICATING SENSITIVE DOCUMENTS

[75] Inventor: Paul Lahmi, Suresnes, France

[73] Assignee: Rank Zerox, France

[21] Appl. No.: 08/930,419

[22] PCT Filed: Mar. 29, 1996

[86] PCT No.: PCT/FR96/00481

§ 371 Date: Sep. 24, 1997

§ 102(e) Date: Sep. 24, 1997

[87] PCT Pub. No.: WO96/31049

PCT Pub. Date: Oct. 3, 1996

[30] Foreign Application Priority Data

Mar. 29, 1995 [FR] France .................................. 95 03668

[51] Int. Cl.⁶ .................................................. G06K 9/54
[52] U.S. Cl. .......................... 382/306; 382/116; 382/135; 382/137; 382/175; 382/180; 382/183; 358/401; 358/405; 358/444; 358/450; 399/366
[58] Field of Search .................................... 382/306, 180, 382/183, 175, 116, 135, 137; 358/401, 405, 468, 444, 450, 300; 399/366, 9; 355/112; 707/500; 283/74, 77, 81, 98, 102, 37

[56] References Cited

U.S. PATENT DOCUMENTS

| | | | |
|---|---|---|---|
| 4,728,984 | 3/1988 | Daniele ..................................... | 358/300 |
| 4,738,901 | 4/1988 | Finkel et al. ............................. | 428/690 |
| 4,739,377 | 4/1988 | Allen ........................................ | 355/133 |
| 4,748,480 | 5/1988 | Jacobs et al. ............................ | 355/133 |
| 4,786,941 | 11/1988 | Regan ........................................ | 355/7 |
| 5,270,773 | 12/1993 | Sklut et al. ............................... | 355/201 |
| 5,452,099 | 9/1995 | Von Meister ............................. | 358/403 |
| 5,467,447 | 11/1995 | Vogel ....................................... | 395/145 |
| 5,481,378 | 1/1996 | Sugano et al. ........................... | 358/501 |
| 5,647,010 | 7/1997 | Okubo et al. ............................ | 382/100 |
| 5,798,844 | 8/1998 | Sakano et al. ........................... | 358/405 |

FOREIGN PATENT DOCUMENTS

| | | | |
|---|---|---|---|
| 493961 | 7/1992 | European Pat. Off. ....... | G03G 15/00 |
| 617545 | 9/1994 | European Pat. Off. ......... | H04N 1/40 |
| 4432741 | 3/1995 | Germany .......................... | H04N 1/40 |
| 9501043 | 4/1996 | WIPO .............................. | H04N 1/40 |

*Primary Examiner*—Leo H. Boudreau
*Assistant Examiner*—Kanji Patel
*Attorney, Agent, or Firm*—Roland Plottel

[57] ABSTRACT

A method and device for securely duplicating sensitive documents. A marking element is entered on the original document to identify its confidential nature, as well as an encoded rules elements which defines duplication restrictions of the document. For each duplication request (101) for a sensitive document (102), the document is digitized (103) to determine the presence of a marking element (104) and to find the duplication restrictions, i.e., the encoded rules elements (106). Duplication may be performed (110) depending on the restrictions defined in the rules elements (106) and after an authorization check (108). A duplication may be obtained by requesting the computerized original of the document from the document issuer. In addition to the selective control of reproduction of documents the method and device is particularly suitable for preventing the duplication of documents for fraudulent purposes, multiple duplication of selected documents, and for copyright administration. It enables the issuer to retain control over the use of sensitive documents without fear of forgery.

9 Claims, 8 Drawing Sheets

SECURE METHOD FOR DUPLICATING SENSITIVE DOCUMENTS

SUMMARY OF THE INVENTION

This invention permits to impede present easiness for industrial spying or else by means of document reproduction or remote-diffusion devices. It permits, by the coupling between, on the one hand, the creation of complementary graphic elements in the document and, in the other hand, the conception of adapted methods:

forbidding or controlling the production or the diffusion of certain sensitive documents, altering according to predetermined guidelines the copy of some documents having a intrinsic value in order to facilitate the distinction between the original and its copy, authorizing the reproduction or diffusion of some documents provided the payment of expenses relative to author's rights, authenticating an original paper or its copy by means of a direct reproduction of the electronic original detained by the original emitter, producing from an paper original an electronic copy or making an electronic transaction controlled by the emitter of the original document, producing a copy of the whole or a part of a global document from an excerpt of this one.

To these purposes, the present invention centralizes the following functions:

Acquiring the document and expressing of a reproduction request,

Processing the acquired document for detecting the sensitive character in the document and, should the occasion arise, extracting the reproduction rules linked to the document, managing and applying the reproduction rules, producing the copied document, and, in some cases, producing a electronic copy or carrying out an electronic transaction, according to the reproduction rules and the expressed request; if required by searching the electronic original.

Today, in the different characteristic elements of document making or reproduction, there are some risks linked to the confidentiality of the information contained in the document or in the use of the produced document:

A—Any paper document from a company can be easily and quickly copied by means of a copy machine within the company. The copy can be easily moved outside the company to its detriment and without any trace, since there is no disappearance of the original.

B—Any document from a company can be remote reproduced by means of facsimile systems and without any trace of this leak nevertheless very harmful to the company.

C—Color reprography systems today permit and increasingly will permit, by means of the integration of more and more efficient technologies, to get copies very faithful to the original, making the differentiation between the copy and the original difficult without having recourse to a more and less extensive expertise.

D—The photocopies of administrative, financial or transactions-related documents can cause, by means of some non-detectable alterings or falsifications, misappropriations of rights that they can generate (tax form, birth certificate, receipts, contracts, invoices, checks . . . ) whatever the sophistication brought to the elaboration of the original document.

E—Some documents have required high efforts to their author who is presently paid only by the diffusion of the original and not by the possible copies of these originals.

F—Some documents, or the global documents from which they are extracted, can't be easily copied by their owner, due to their nature (binding, clipping . . . ) or to their deterioration (incomplete document, partial diffusion).

G—For any computer-related document produced on a collective printer, the produced document that may be highly confidential can be consulted willingly or unwillingly by third persons between the instant of its production and the instant when it is recovered by its owner.

To all these problems related to the safety of diffusion and use of the documents, not very efficient or too awkward conventional solutions that are presently applied are:

A/B—These points are solved only by a harsh supervision (under lock and key) of the strategic documents of the company or by a limited access to the reproduction means. This is often ineffective, due to a bad estimation of the strategic importance of some documents and to the difficult discipline rarely applied for this protection.

C—The protection is ensured by a developed graphism, the use of specific media or technologies (metallic wire, magnetic ink or track, holograms . . . ) difficult to implement or costly. The complexity of these solutions limits their use and often only an expert can distinguish between true and false.

D—Today only the certified copies provide with a relative safety that can be absolute only by a written confirmation request to the emitting authority. This process is heavy and can often be implemented only exceptionally and when there is already a doubt.

E—Only the laws concerning the protection of the authors permit to prohibit such copies, but out of penal sanctions that are not easy to apply and that are not very dissuasive, nothing really impedes such infringements.

F—Today the user must "unbind" the document or make altered copies or else make a manual request to the author of the document when this one can be identified and when he has means for answering to this request; as a consequence the present limits.

G—The proliferation of personal printers with all the problems arising in terms of organization and maintenance and that can't prevent main structures from being provided with collective printers for more sophisticated works.

The method and devices for implementing this method permit to solve this problem for safety of production, diffusion and use of sensitive documents. Prior to the definition of the invention, it would be useful to define the different kinds of document that can be processed by the devices (these categories may overlap):

the first category of document concerns any free-diffusion document having neither confidential nature, nor juridical value, nor intrinsic value due to its aspect and not belonging to any of the following categories. This type of document is named as "conventional document" hereafter, the second category concerns the documents of confidential nature, i.e. the contained informations of which must not be freely disclosed, this second category being named as "confidential document" hereafter, the third category concerns documents certifying either transactions, or capabilities or rights; documents the authenticity of which is essential. In this category, it is possible to include the following elements: invoices, diplomas, receipts, contracts, law acts or administrative documents, tax report, checks, restaurant-checks, . . . This category is named as "authenticatable document" hereafter, the fourth category concerns any document the matter of which results from some work and the diffusion of which justifies the payment of rights to its author. In this category, it is possible to include books, magazines. . . . This fourth category is named as "author's document" hereafter.

the fifth category concerns any document the identical copy (or approximately identical) of which may represent a damage for the emitter of the original due to a derived use of possible copies. Only the actual document has a value but not the informations it contains. In this category, it is possible to include the bank notes, the tickets and other documents with intrinsic value. This latter category is named as "valuable document" hereafter.

In order to gather all the categories of documents other than "conventional document", these categories will be gathered into a general category "sensitive document".

Furthermore, a distinction will be made hereafter between a paper document concerning a conventional document on a paper medium and an electronic document characterizing the electronic element that corresponds to the whole definitions under the form of electronic files of a document that may correspond after printing request to a paper document.

In order to describe the invention, it will be referred to the digitized form of a document: for a paper document, it means its decomposition into black or white elementary points or defined by a color attribute. This decomposition allows an electronic storage of the file and brings the opportunity of a logical processing.

The main feature of the invention consists in the following method based, on the one hand, on the definition of additional specific graphic elements on the document to be processed, and on the other hand, on the definition of the actual processing.

On the documents, the new elements are:

the marking, the rules.

The "marking" is an element which permits to differentiate the "sensitive documents" from "conventional documents". This "marking" is achieved by a peculiar graphism (visible or not) on the whole document that does not alter the readability of the actual document but that must be detectable even on a reduced part of the document. This "marking" is present on any document considered as a "sensitive document" and consequently is missing from any "conventional document".

The rules are an element concerning all the "sensitive documents" and define the rules and restrictions of reproduction of the concerned document, this element is referred as "rules" hereafter. The reproduction rules and restrictions may require the knowledge of elements of referencing and identification of the presented document that are then integrated to the "rules". These "rules" permit associate to the document the indications concerning the reproduction opportunities as well as the actions that the processing device must achieve when a copy of the document is requested to it. This element is a complement to the "marking" (a document without "marking" has no "rules", and an element having a "marking" must detain the "rules"). The "rules" are encoded on the document by using a technique that alters at a minimum the readability of the actual document. If the "rules" enable the reproduction of the document but with an alteration of the original, the alteration guidelines are included in the "rules" by using a appropriate language (already existing or specifically defined for this use).

The techniques used for the definition of the "marking" and the "rules" must be compatible with the digitization of the document in view of a search and an extraction of these elements within the actual document.

The corresponding method includes the following steps when a document reproduction is requested:

a definition request of the reproduction work to carry out, a presentation of the original paper document concerned by the reproduction request, a digitization of the original document, an analysis of the digitization result for detecting a possible "marking" of the document in order to determine the "conventional" or "sensitive" nature of the document; carrying out of the request when the presented document is a "conventional document", If a document is identified as a "sensitive document" after the previous step, an additional analysis for searching and extracting the "rules". In the case of an anomaly, a rejection of the request with possibly safety actions.

If the document is identified as a "sensitive document" farther to the previous steps, authorization controls of the request with regards to the elements defined in the "rules" and to the elements characterizing the request and the requester; rejection of the request if this request is not authorized with possibly safety actions.

If the document is identified as a "sensitive document" and the request is authorized further to the previous steps, processing of the actions defined in the "rules" or deriving from them in combination with complementary elements provided by the requester, Production of the requested reproduction according to the guidelines deriving from the interpretation of the "rules" if the presented document is a sensitive document and the reproduction is authorized. In the case of an authorized reproduction of a "sensitive document", the carrying out of actions provided in the "rules" or those deriving from said "rules" may have the effect of getting a different or altered copy compared to the original and equally may generate management actions linked to the achieved reproduction. The document produced from a "sensitive document"-type original is also a "sensitive document" that has own "marking" and "rules" (that may be different from those linked to the original).

For the implementation of the method, the following "markings" matching the above-cited definition are proposed in a non-limiting way (it is better as a way of normalization that only one among possible "markings" be chosen):

A first recommended "marking" consists in the superposition to the actual document of a fog of elementary points or signs.

Another recommended "marking" consists in a peculiar elementary-thickness pattern superposed to the actual document.

A third "marking" consists in framing any character within the document by an elementary-thickness filet.

For the implementation of the method, the "rules" that comprise several informations that can be characterized by strings of alphanumeric characters and consequently by using a conventional digital encoding (1 byte for one character) can be described by a succession of binary values. For the encoding of these values, the use of bar-codes is satisfactory. However for discretion reasons (the insertion of the "rules" must not damage the aesthetic of the document) and efficiency reasons (the decoding is made by analysis of the digitized document but not by scanning of the laser beam), the following encoding is proposed as a non-limiting way:

- At predefined locations, several occurrences of the "rules" are inserted.
- Each occurrence comprises a graphic heading and actual data,
- The heading permits the identification of the character "rules" of the set heading and data and the definition of an origin and a direction for reading coded data,
- The coded data are represented by a succession of regularly-spaced elementary-thickness bars, the presence or the absence of this bar corresponding to the value 0 or 1 of the corresponding position.

In order to ensure a larger dependence between the "rules" and the document on which they are inserted (i.e. in order to avoid a potential easy substitution of the "rules" of a document by those more permissive of another document), the encoded values could be modulated by statistical values linked to the document (number of characters of the page for example) so as that the decryption could establish a coherence diagnostic between the read "rules" and the corresponding document.

For the "marking" and for the "rules", an ink reflecting only in the infrared can be used for achieving their materialization: in this case, the digitization of the document will have to provide each elementary point of the document with an "infrared" attribute. This peculiar "marking" can be limited only to the "valuable documents": provided that any device technically able to produce a copy with a sufficient quality to be confounded with the original, could detect both the conventional "marking" and the peculiar "marking" (the other devices will produce, due to their technologic limitations, sufficiently altered copies not to be as a consequence considered as "sensitive documents").

For the implementation of this method to the local reproduction of "sensitive documents", the following device is defined. This device comprises the following functional modules: "user interface module", "digitization module", "analysis module", "control module", "creation module" and "printing module".

- The user interface module can include existing features on the photocopier-type systems with the opportunity for the user to define his request and to be able to precisely identify himself (name, password, service . . . ) either by acquisition or by badge presentation.
- The "digitization module" could be a conventional digitizer ("scanner") with if necessary an automation of paper flow in order to be able to digitize a set of documents in entrance. The digitizer provides a decomposition in black and white elementary points or with color attributes according to the case in order to permit an electronic operation of the presented document, if the "marking" and the "rules" use inks that reflect only in the infrared, the digitizer must be able to provide an infrared attribute at each elementary point of the document in surplus of the conventional digitization.
- For the "analysis module", the "control module" and the "creation module", the functions are carried out by a computing entity (microprocessor or the like) with internal communication buses complying with the driving of the whole modules of the device. The analysis module includes algorithms adapted for the detection and the extraction of the "marking" and the "rules" from the digitized document. The "control module" carries out the control of the whole modules and their cohesion.

The "creation module" composes the digitized image of the document to be produced (when authorized) from the digitized image of the original document without its "marking" and its "rules" while respecting the modification guidelines included in the rules of the original. The document built this way comprises its own "marking" and its own "rules".

- The "printing module" that permits to obtain the paper copy defined by the user request from corresponding electronic elements when it is authorized, could be implemented by the analogue module existing in the digital photocopiers or in the printers. If the "marking" and the "rules" use inks that reflect only in the infrared, the "printing module" will have to carry out the printing.

The set of such defined modules constitutes a functional entity named "document server" hereafter. The functional entity "document server" could be completed with new functional modules according to the following characteristics of the invention.

The device defined this way will be able to make the following actions when a user wishes to reproduce a "sensitive document" (identified as sensitive by the "marking")

- Carrying out authorization controls deriving from the decrypting of the "rules" of the presented document in view of the user via the "user interface module",
- Actuating safety systems (capture of the original, alarm . . . ) in the case of a non authorized reproduction of a "confidential document"-type document,
- Accounting author's rights concerning the document in order to get a regular report of these rights by an authorized person or organization in the case of a reproduction of an "author's document"-type document,
- Generating a modified copy versus the original by carrying out the modification guidelines of the document derived from the reproduction in view of the original; these guidelines derive from the interpretation of the rules, more peculiarly and in a non-limiting way for the "valuable document"-type documents.

For the implementation of the method in the case of a remote reproduction, the same device than above-cited can be used, provided that two new functional modules be included: a "communication module" and an "output management module". These two new modules belong to the functional entity "document server".

- The "communication module" permits a dialogue and exchange of any electronic file required for the reproduction of documents, between two "document servers". Thus, a receiving "document server" carries out the reproduction request of an emitting "document server"; the two "document servers" altogether globally respect the above-described method according to the invention. The "communication module" may include the equivalent modules from telecopiers or computer stations connected to a computer network. At this level, any protocol ensuring the securing of transmitted data at a confidentiality level can be integrated.

The "output management module" is a computer module activated when the requested copy results from an external request (from another device) and that makes a retention on the document to be produced, freeing it only when the receiver has identified himself to the receiving "document server" producing the document. In order to make the device not only reproducing "sensitive documents" locally or remotely but also producing the originals of "sensitive documents", said device keeps the functional entity "document server" identical in terms of components to the previous definition, with only adaptations in its operation. In parallel, a "driver" is added in every computer system provided for printing sensitive documents. This "driver" is a computer module that is integrated to the host computer system that is provided for sending to the "communication module" of the "document server" by using the communication capabilities of the computer system.

The actual document under digitized form derived from an application resident on this system, The "rules" associated with the document or the elements permitting their reconstitution, The actual characteristics (paper Format, Recto-Verso, Pages to be printed, numbers of exemplars Orientation . . . ) as well as the identifier of the emitter in relation to the receiver device when the document to produce is a "sensitive document", The transmission of these informations permits the execution by the device of printing of an original of a sensitive document by using the same method than for the local reproduction from a remote reproduction request.

For implementing the method in the case of the production of originals of "authenticatable documents" and the production of authenticated copies from these originals, the device comprising the "document server" and the "driver" as previously defined includes two new functional modules: the "directory module" integrated to the functional entity "document server" and the "archiving server";

The "directory module" is an electronic module, it permits to make locally correspond electronic addresses (permitting on an electronic communication network the establishment of a communication session with the designed correspondent) with the identification of the emitting organization as can be defined in the rules. This "directory module" is updated by the holder of the "document server" (via a suitable dialogue at the level of the "user interface module" or by a computer link with the computer systems of the holder of the "document server") so as to accept to authenticate only documents from perfectly identified authorized organizations. This prevents from using falsified "rules" referencing fictive organizations; in this case, the device will not be able to authenticate the document because it will be impossible for the forger to establish a link between the device and this false organization.

The "archiving server" is a conventional computer system having sufficient storage, processing and communication characteristics. It mainly comprises two functional sub-modules: a "communication module" (of the archiving system) and an "archiving manager",:

the "communication module" (of the archiving server) allows the "archiving server" to communicate with any computer system having to produce originals of "authenticatable document" and with any "document server" having to produce an authenticated copy from an original of a "authenticatable" document, the "archiving manager" carries out any required management and control on the "archiving server" for the production of an "authenticatable document" and for the production of an authenticated copy from an "authenticatable document".

Thus, when a computer system produces an authenticatable "sensitive document" on a "document server", the "driver" associated with the device simultaneously sends the same document under its electronic form accompanied with complementary elements defining the "rules" to the "archiving server".

When a user wishes to get an authenticated copy of an "authenticatable document" on a "document server", after the identification of the sensitive character of the document by means of the detection of the "marking" and the authorization control following the interpretation of the "rules", the "archiving server" linked to the document to be reproduced is searched in order that said "archiving server" send electronic elements required for the carrying out of the request. When the presented original features only an excerpt of the corresponding archived electronic original, the "archiving server" permits the requester to enlarge his request by sending to the "document server" all the required elements defining the global document. The "archiving server", in parallel with the carrying out of the request, makes any required additional authorization control or any management action associated with the delivering of the copy; it can also send guidelines that are complementary with the "rules" encoded in the presented original in view of the production of the copy (for example, in order to make appear in clear on the copy the copying character as well as the obtaining date of this copy). The "archiving server" also manages the royalties concerning the author's rights when required.

From an "authenticatable document", the obtaining of an electronic copy, or even the carrying out of an electronic transaction (for example, a check issued by an organization X and presented by a user Y generates under the control of the archiving system of X a transfer from the account of X to the account of Y) depending on the presented original can be better than the obtaining of a paper copy.

For implementing the method in the case of a production of an electronic copy or electronic transaction authenticated from an original of a "authenticatable document", the device comprising the "document server", the "driver" and the "archiving server" as previously defined includes the new functional module: "processing module":

the "processing module" is integrated on any electronic system having to receive the required authenticated electronic copy or transaction, it manages the reception of electronic elements from the "archiving server" following the request expressed at the level of the "document server" for producing on the host computer system the required element, the "document server" carries out all the analysis and control processing required for the processing of the "sensitive document".

DETAILED DESCRIPTION

Figure 1:
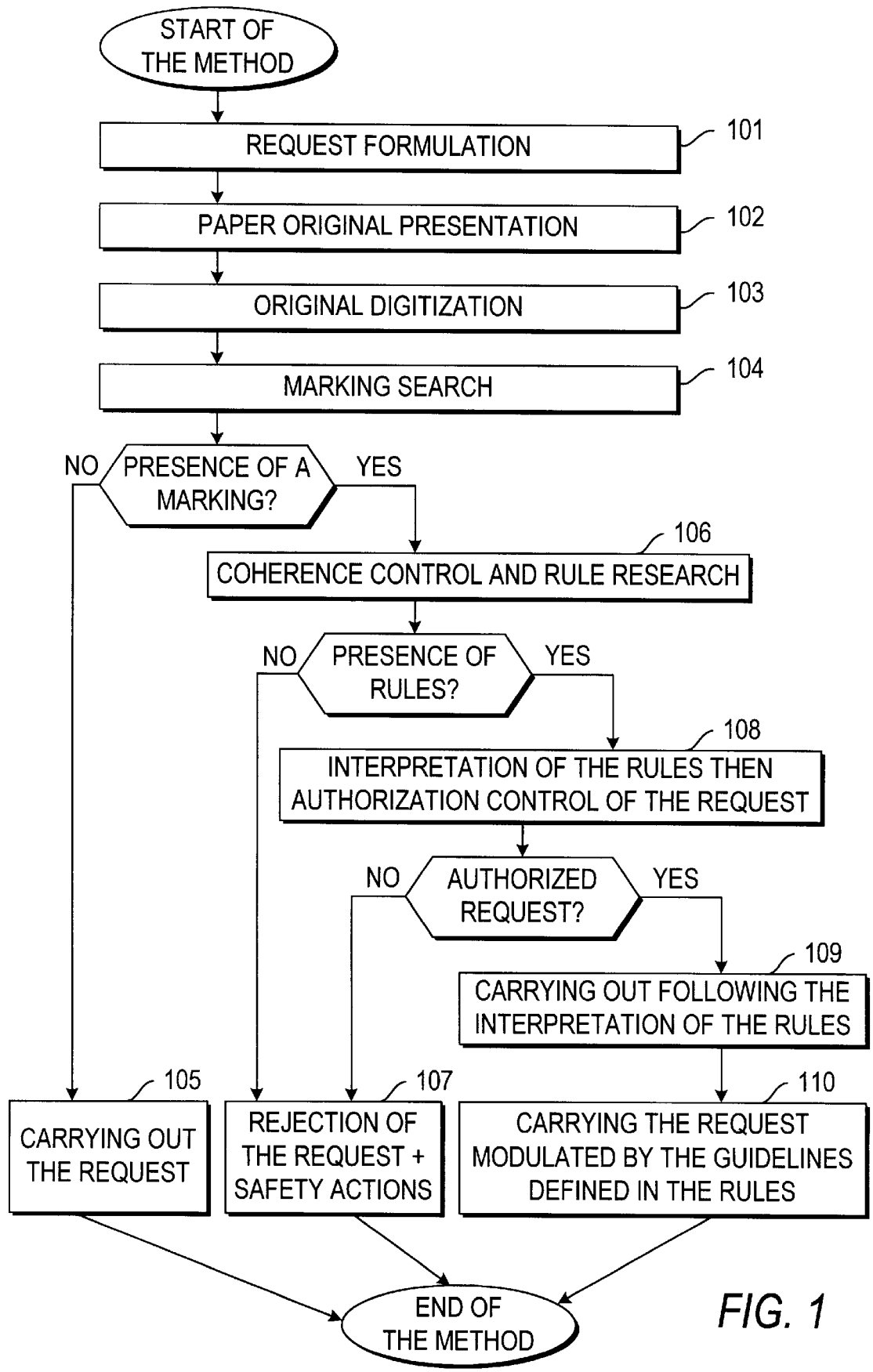
FIG. 1 is a flow-chart of the method.
Figure 2:
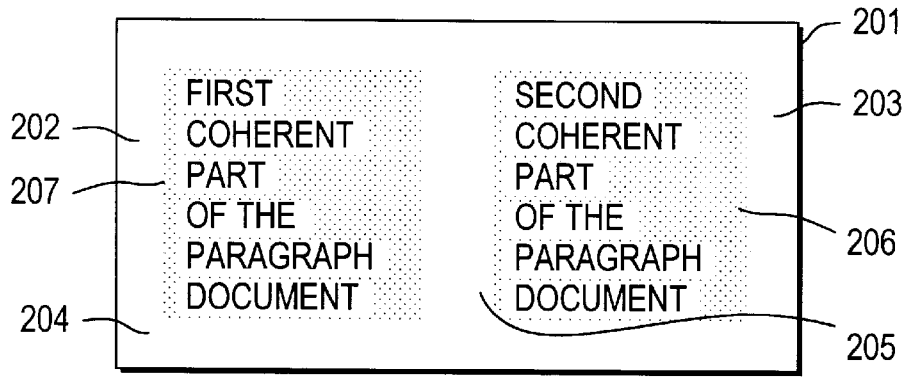
FIGS. 2 to 4 feature the various examples of "markings" recommended according to the definition made in the method.
Figure 3:
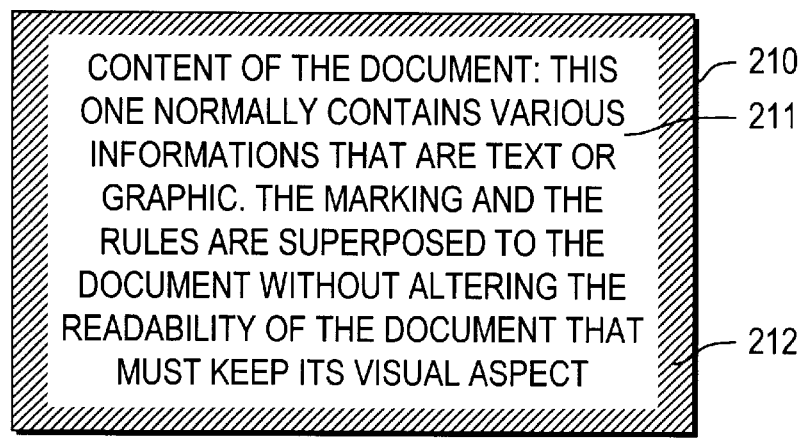
Figure 4:
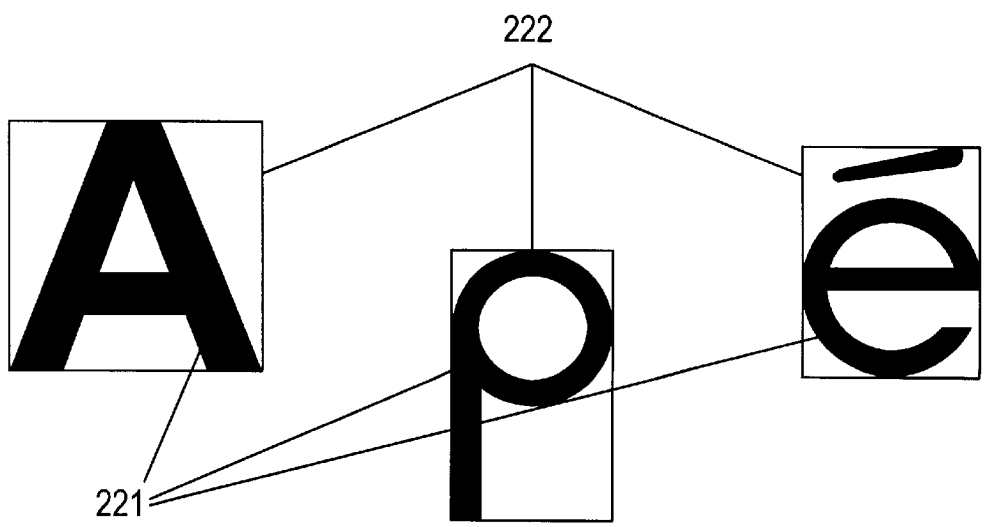
Figure 5:
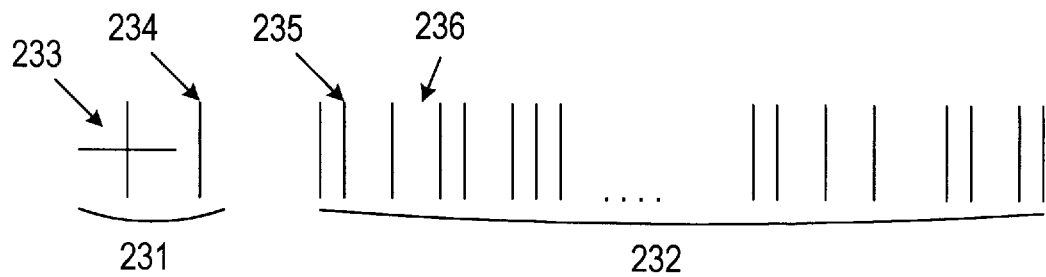
FIG. 5 is a representation of an occurrence of "rules" according to the recommendation made in the present invention.
Figure 6:
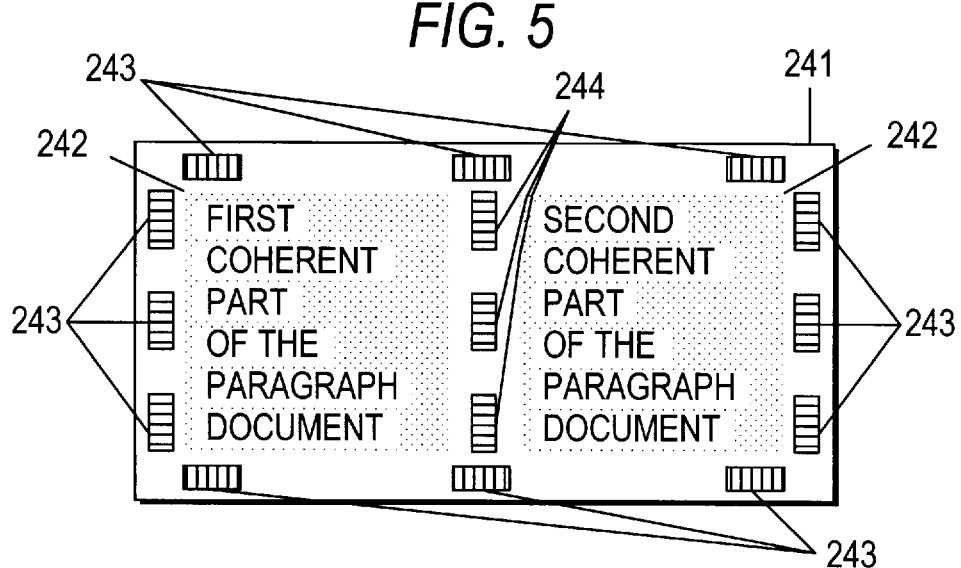
FIG. 6 is an example of implantation of the various occurrences of "rules" in a document using the first recommended type of "marking"
Figure 7:
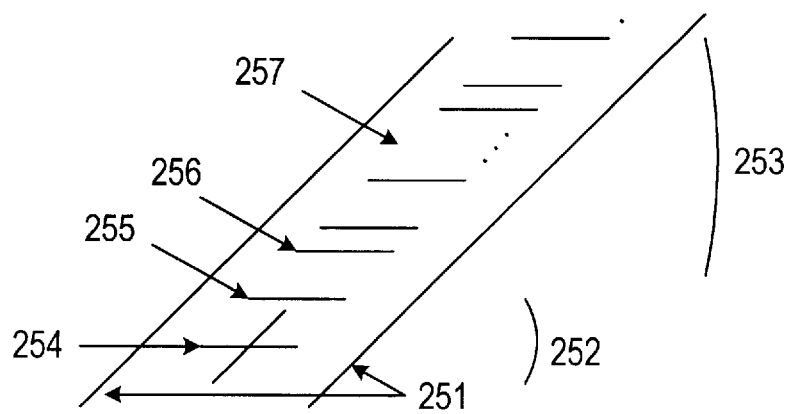
FIG. 7 illustrates the adaptation made on an encoding of "rules" according to the recommendation for a pattern-type "marking"
Figure 8:
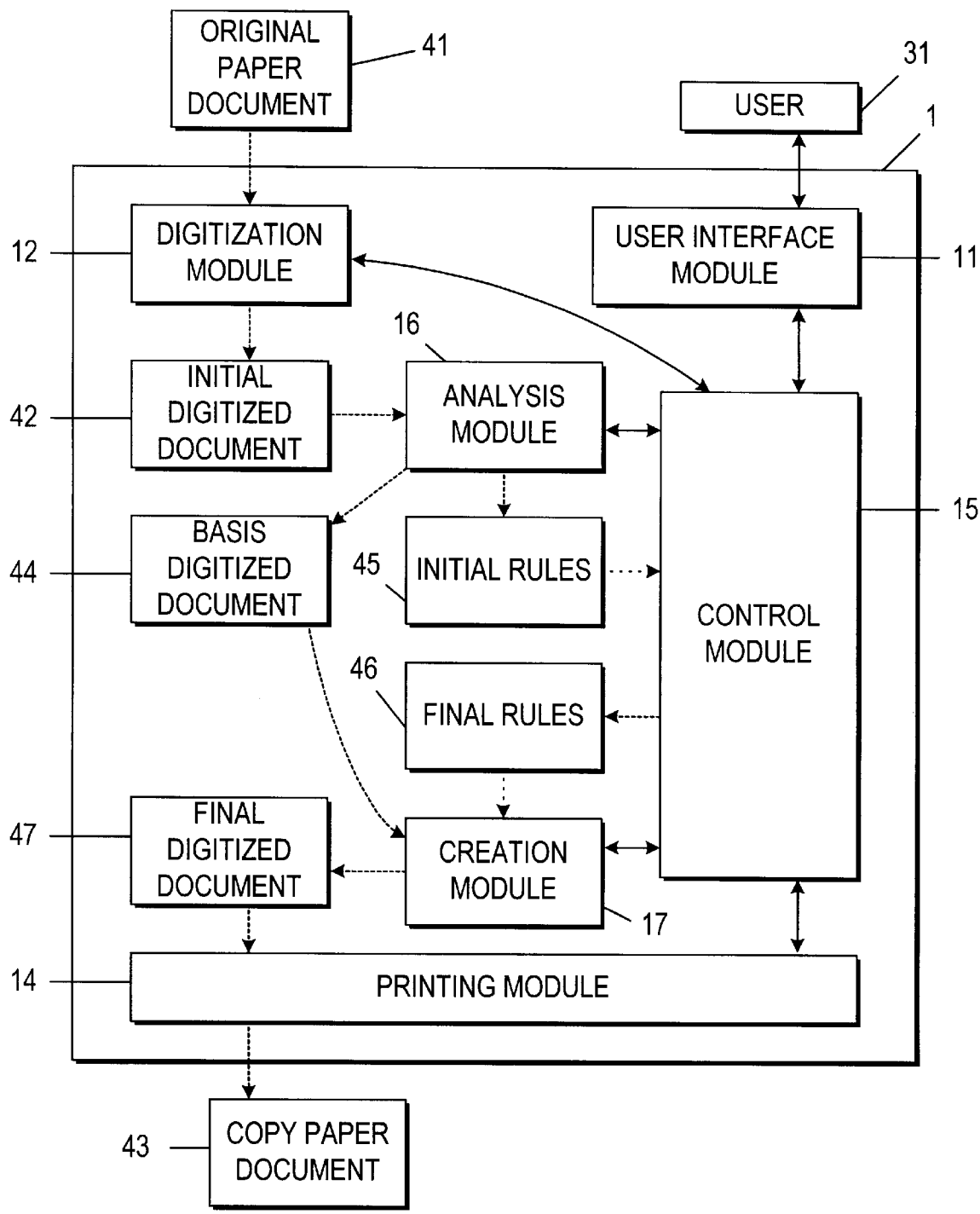
FIG. 8 illustrates the organic composition and the operation of the device for implementing the method in the case of a local reproduction.
Figure 9:
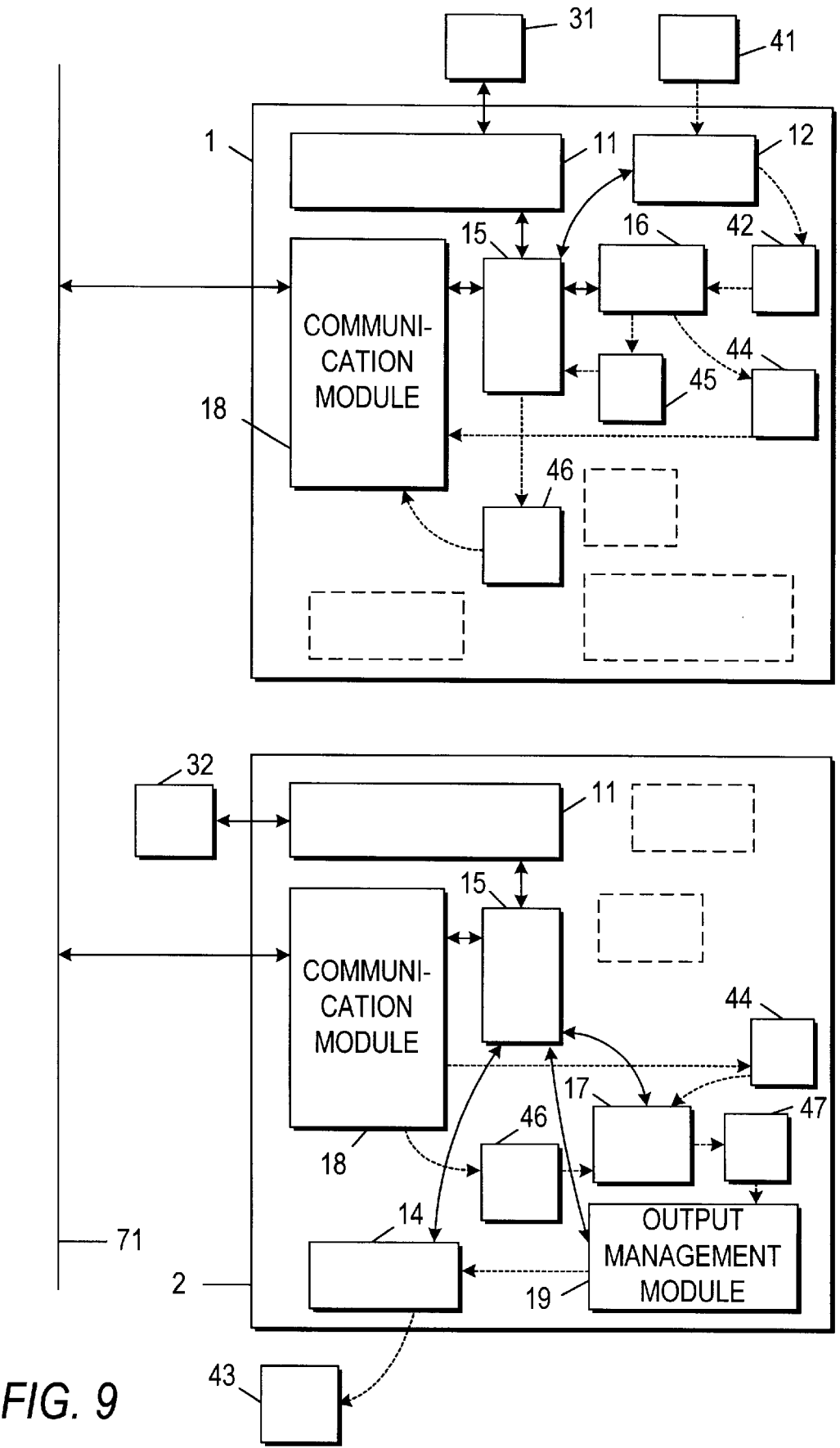
FIG. 9 illustrates the organic composition and the operation of the device for implementing the method in the case of a remote reproduction.
Figure 10:
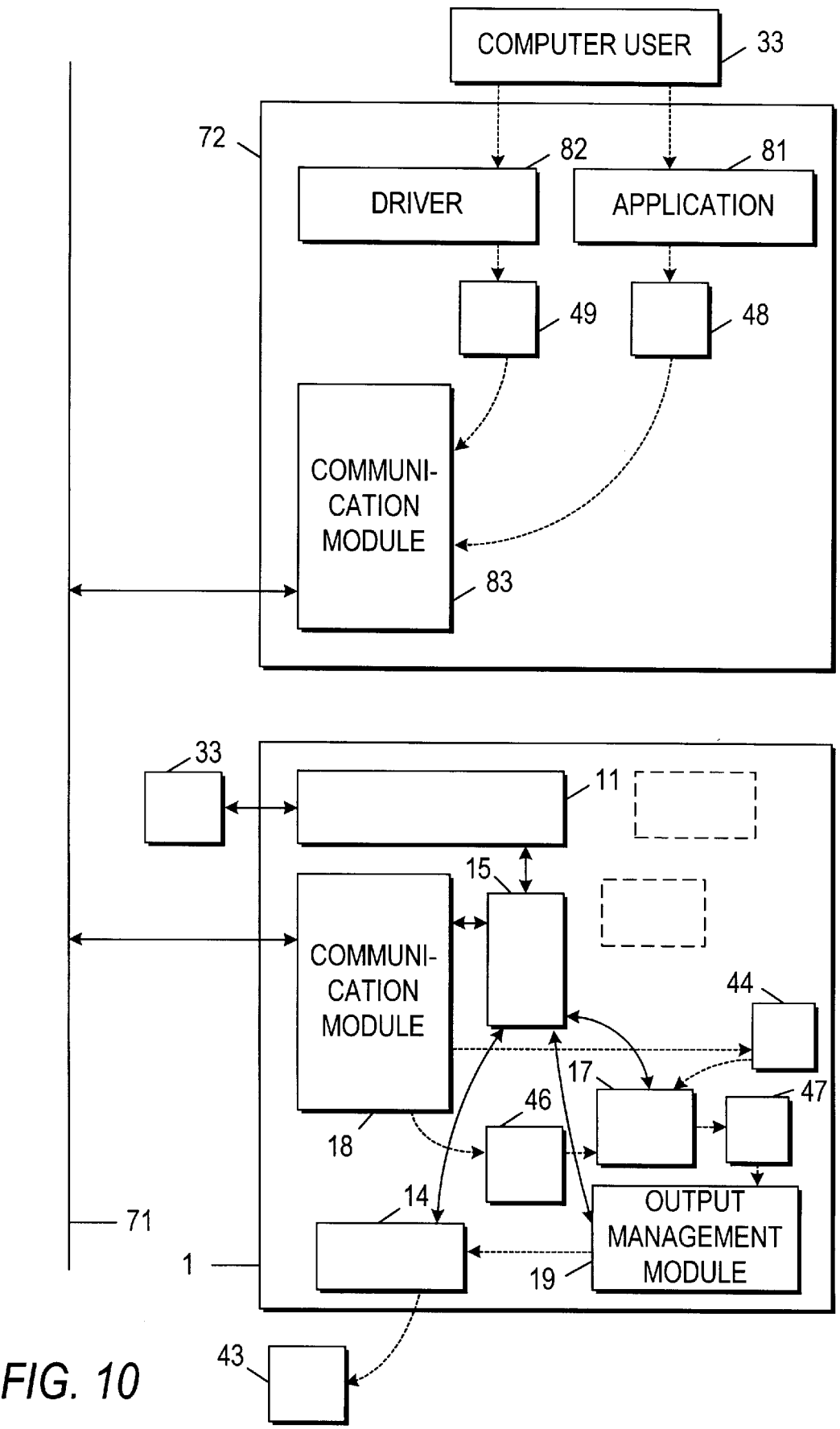
FIG. 10 illustrates the organic composition and the operation of the device for implementing the method in the case of a printing from a computer system.
Figure 11:
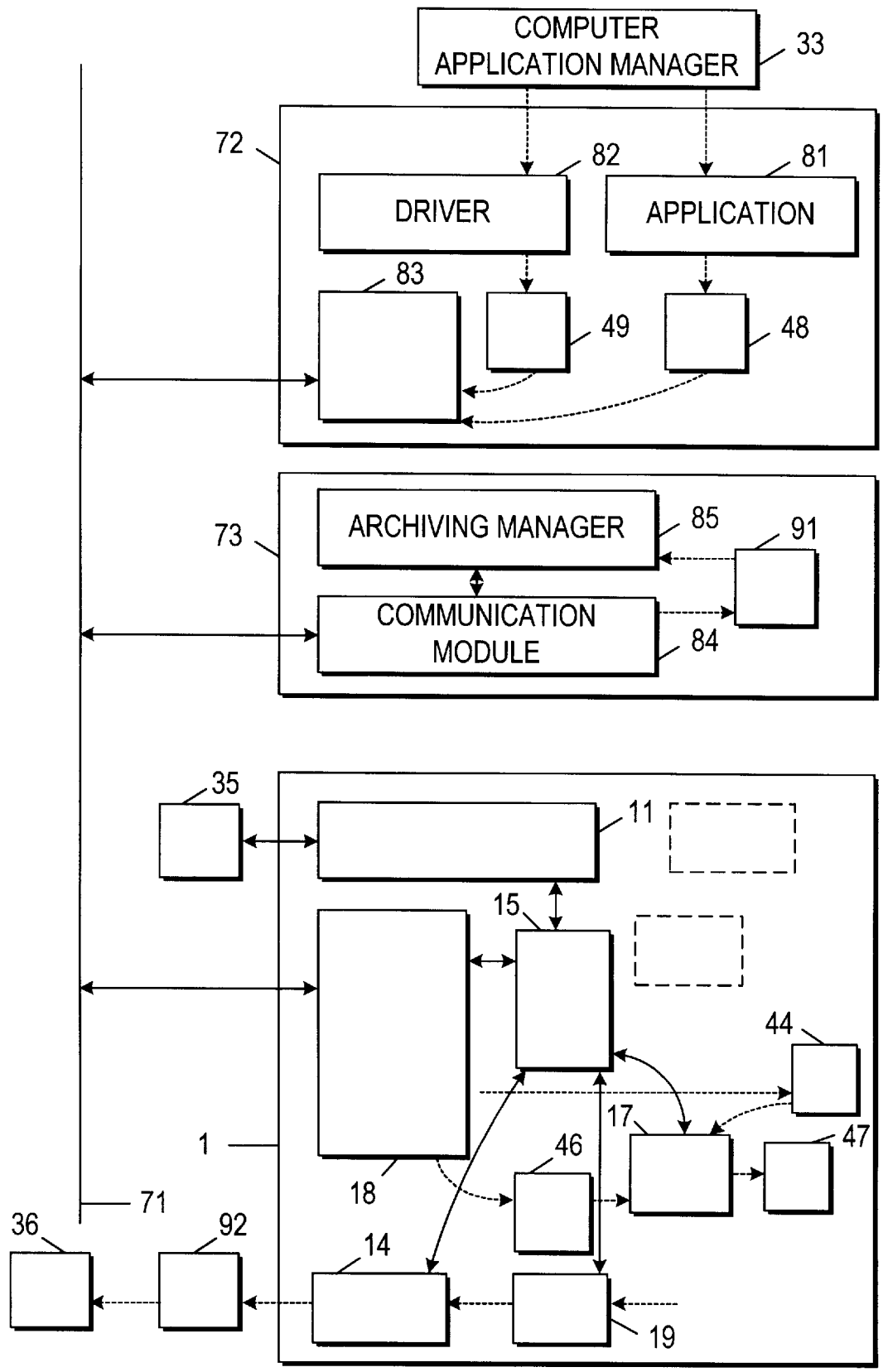
FIG. 11 illustrates the organic composition and the operation of the device for implementing the method in the case of the production of an authenticatable original.
Figure 12:
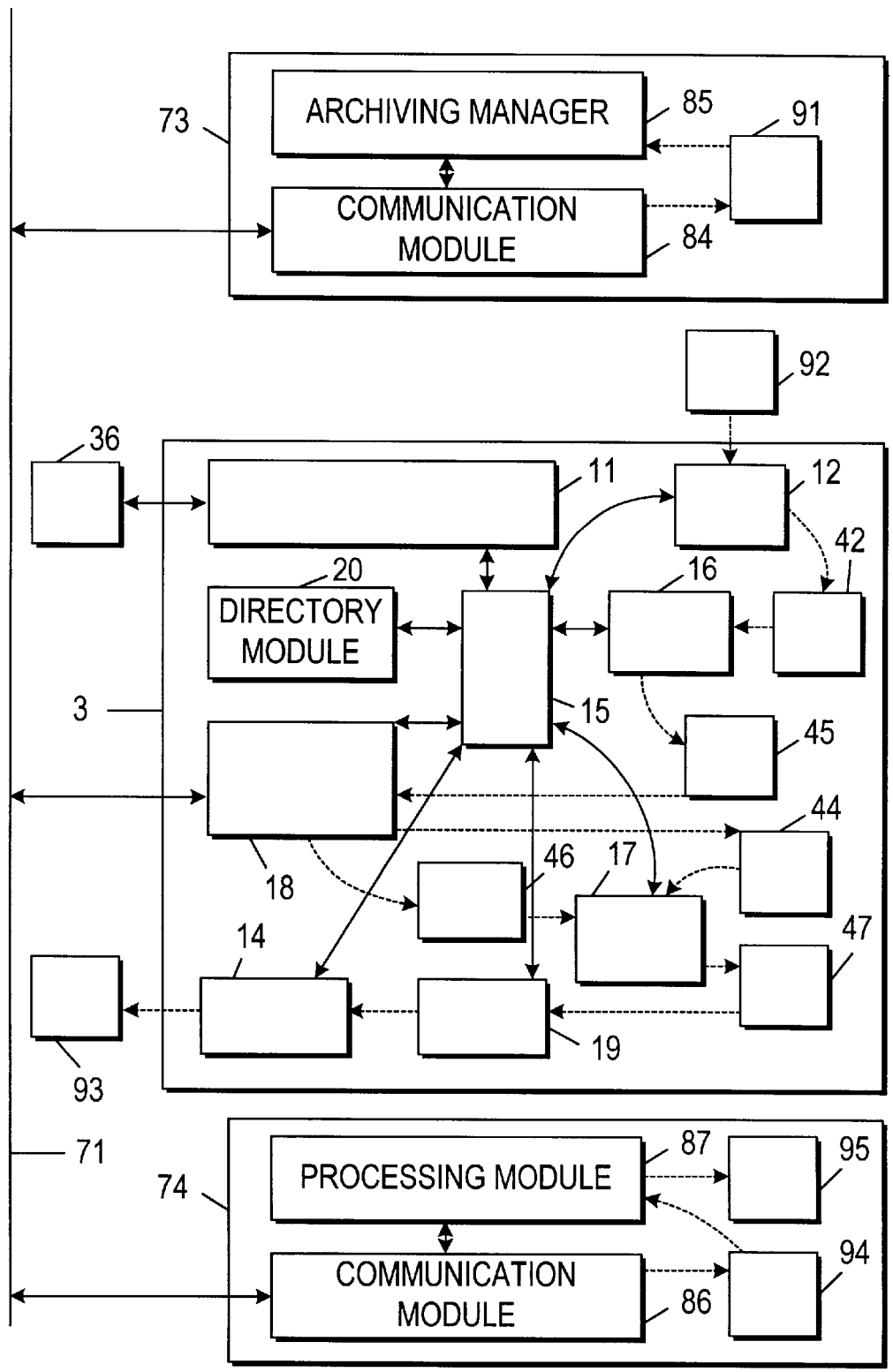
FIG. 12 illustrates the organic composition and the operation of the device for implementing the method in the case of the production of an authenticated paper copy, of an authenticated electronic copy or of an authenticated electronic transaction from an authenticatable original.

A detailed description of the invention follows, with reference to these drawings and figures:

The method links up the following steps:

Formulation of the request (101)

The method is initialized by a reproduction request that mentions which work has to be done on the original that will be presented. This definition allows to define, among others, the paper and the output format, the number of copies, the local or remote nature of the copy. If the presented document features only a part of a more global "authenticatable document", the requester indicates at this level only his wish to get an authenticated copy, the whole request being defined in this case in the request authorization control step (cf. 108).

Presentation of the paper original (102)

Further to the request, the document to be duplicated is presented. The page or the pages to be reproduced are therefore presented in the desired order. However, in the method, each page is an integral element that is processed in a distinct way, the following steps can generate different actions according to each of the presented pages. The presented document may feature only an excerpt of a more global document if this document is an authenticatable document-type document and if the requester desires to get a copy of the whole or of a part of this global document independently of the presented excerpt.

Digitization of the original (103)

In order to be processed by a logic algorithm, the paper document that is a material element is transformed into a logic element. To this aim, the digitization modelizes each presented page into a matrix of points. An attribute is associated with each point; white, black, color, infrared or other according to the technology used to materialize the information on the document.

"Marking" search (104)

A search is carried out on the logic image of each page (i.e. after digitization), for detecting the presence of a "marking". As the "marking" is a graphic element that is predetermined and normalized in the present invention, a detection algorithm can be defined according to the selected "marking". The algorithm must take into account an error margin corresponding to the imperfection of the printing and of the digitization. The result of this step is a logic value: YES if a "marking" is detected on the processed logic page and NO when no "marking" is detected on the logic page. This value conditions the following steps of the processing.

Processing in case of non-detection of a "marking" (105)

If no "marking" has been detected on the processed page, the initial request is made for this page since said page constitutes a "conventional document". However, the global request will only be integrally taken into account if all the presented pages for a same request are "conventional documents".

Processing in case of positive detection of a "marking": Search of the "rules" and coherence control (106)

When a "marking" is present, the document is considered as a "sensitive document". In this case, reproduction constraints are defined and are inserted under the form of "rules" into the document. The aim of the present step is to detect said rules and to check their validity, as well as to extract them. The rules being encoded under the form of a predetermined and normalized graphic binary coding, an algorithm of detection and extraction can be defined, including the controls of binary validity if it is required in the encoding. If the encoding is provided for several occurrences in the page, the coherence of the decrypting of the various occurrences is carried out. If the encoding is modulated by statistical values related to the content of the actual document, these statistical values are computed again in order to validate the values of the extracted "rules". The result of this step is a logic value: YES if valid "rules" are detected in the processed page and NO if the document does not include "rules" and if the document includes invalid "rules". In parallel with this value. a more precise diagnostic can be provided in view of suitable processing.

Processing in case of presence of "markings" and of absence of valid "rules (107). This case being considered as abnormal (the method defines the complementary presence of a "marking" and "rules"), the initial request concerning the processed page is rejected. Furthermore, safety actions can be generated: alarm, capture of the original, memorizing of the request and his author. . . .

Processing in the case of the presence of a "marking" and the presence of valid "rules" (108). The "rules" are interpreted in order to verify that the expressed request is authorized and additional controls towards the requester are made (the authorization may depend on the characteristics of the requester or on the request itself: for example, the local reproduction may be authorized but not the remote reproduction). If the expressed request concerns the obtaining of an authenticated copy, independently from the authorization controls that are systematically made for any sensitive document, an additional control is made in order to check that the presented document is effectively an "authenticatable document"; in this case, the elements characterizing the electronic original of the global document corresponding to the presented "authenticatable document" are searched in order to allow the requester to complete if necessary the definition of his request, or even to leave it. At the end of these controls, a logical value is updated: NO if the expressed request is not authorized or not maintained and YES if the request is authorized and maintained (the control step may make appear a royalty that the requester may accept or refuse).

Processing in the case of a non authorized or non maintained request (107)

Like in the case of the presence of a "marking" and the absence of valid "rules", the request is rejected and there is possibly activation of safety systems if the initial request corresponds to a violation attempt of a "confidential document"-type document by a non authorized person.

Processing in the case of an authorized request on a "sensitive document" (109)

The digitized image of the document to be produced is generated according to guidelines deriving from the nature of the request and of the operation of the "rules", further including modifications towards the original (masking, overprinting, color suppression, graphism modification . . . ); a consequence of that can be the building of the image of the actual copy not versus the digitized image derived from the presented document but from an electronic original linked to the presented document when an authenticated copy is required. These guidelines could have been encoded according to the rules by elementary orders expressed in a suitable language. The image made this way includes a proper "marking" independent from the "marking" of the original document and proper "rules" that could be different from the initial "rules" (in particular, the reproduction rights of the obtained copy could be different from those of the original). In addition to these direct actions on the produced document, additional actions could be made concerning the accounting of author's rights (according to informations contained in the "rules") or globally on the production management of sensitive documents (date, hour, references of the produced documents, identity of the requesters . . . ) for consultation by an appropriate manager.

Carrying out of the request (110)

The document under its digitized form is transformed into a paper document.

For the implementation of this method, a predefined and normalized "marking" has to be established, for that, various typical "markings" are recommended by the invention. Schemes 2 to 4 give a representation of said "markings".

In the following definitions, whenever an elementary thickness is indicated, it means that the thinnest thickness able to be printed and then to be detected after a digitization is chosen (possibly modulated by an algorithm able to partially compensate these limitations).

The first recommended "marking" concerns a typical document (201) comprising several coherent parts that are paragraphs or graphics (in the mentioned example, this document has two coherent parts that are 2 paragraphs (202) and (203)). Out of the coherent parts, the document has two main margins (204) and margins separating the coherent parts (205). Only in the coherent parts outside the characters (207) or graphics constituting the document, isolated points (206) are disposed within the whole coherent parts without being superposed to printing components of the texts and graphics according to pre-established density norms. Unlike the representation of scheme 2, the points are thin enough not to alter the visibility of the document (here, they are more imposing for illustrating aims, moreover the used density is not representative of the one that will be used as a normalization); the points can be advantageously replaced by any more complex symbol (with an elementary thickness in order not to be harmful to the readability of the document).

The second recommended "marking" consists, for a typical document (210) including a set of text and graphic elements (211) in superposing a pattern. In the present case the pattern comprises parallel oblique bars (212) extending from one edge of the document to the other alone a predefined spacing with an elementary thickness in order not to be harmful to the readability of the document.

The third recommended "marking" consists for a typical document (non represented), in framing each character (221) by a rectangular filet (222) with an elementary thickness.

The recommended "rules" are encoded on a document under the form of several identical occurrences. Each occurrence comprises a heading (231) and a data part (232). The heading (231) permits the identification of an occurrence and the determination of its reading direction: to this aim, the heading in the proposed recommendation comprises a sign "+" (233) with an elementary thickness followed by an orientation bar (234) with an elementary thickness. This heading (231) permits the identification and the decryption of the data part (232) for which at each predefined spacing an elementary-thickness bar provides with a binary value 0 or 1 by its presence (235) or its absence (236). The assembling of these binary values permits the reconstitution of the interpretable values of the "rules".

For a same document, several occurrences of "rules" are inserted, thus in a typical document (241) using for example a fog-of-points-type "marking", it is possible to define main margins framing the document and intermediate margins separating each coherent part of the document (242): paragraphs, graphics. . . . An occurrence of "rules" is inserted in each main margin, at each end and at the middle (243) in the limit of the available place. Similarly, an occurrence is inserted at each end and at the middle of each intermediate margin (244) in the limit of the available place. If the used "marking" is a pattern-type "marking", the graphism of the "rules" is adapted for being inserted between two pattern elements (251). The "rules" still consist in a heading (252) and a data part (253), the signs and bars constituting the encoding of these elements ((254)(255) (256) and (257)) are adapted for maintaining a parallelism between themselves, when it is justified, and with the pattern elements (251).

The device proposed for the implementation of the method to its use for a local reproduction is materialized by a "document server" (1) that mainly includes the following functional modules: a "user interface module" (11), a "digitization module" (12), a "control module" (15), an "analysis module" (6), a "creation module" (17) and a "printing module" (14). This "document server" (1) permits a user (31) to request a paper copy document (43) from a paper original document (41). For that, the user (31) enters his original (41) into the "digitization module" (12) and defines his copy work to the "user interface module" (11). Following this request. the "user interface module" (11) sends it to the "control module" (15).

This module (15) controls the "digitization module" (12) to make it providing a digitized document (42) from the paper original (41), thus exploitable by an electronic-type entity. When the initial digitized document (42) image of the presented document (41) is obtained the "control module" then requests to the analysis module" (16). This module (16) extracts from the initial digitized document (42) the actual basis document (44), i.e. excluding any "marking" or any element corresponding to the "rules". In parallel with this result the analysis module determines the presence or not of a "marking" and if this detection is positive, searches the "rules" and reads them to form from them a exploitable electronic file (45); this module (16) validates at this level the concordance between the read "rules" and the presented document (41), a diagnostic concerning this concordance is integrated to the exploitable "rules" (45). When no "marking" is detected, that means that the original (41) is a "conventional document"-type document; the "control module" (15) then requests to the "creation module" (17) to make it directly fabricating the final digitized document (47) from the basis digitized document (44). Then, the "control module" (15) requests to the "creation module" (17) for the direct obtaining of the requested copy (43) from the final digitized document (47). If a "marking" has been detected and if no "rule" could have been read or if the different occurrences of the read "rules" are not coherent between themselves or of the read "rules" do not correspond to the presented document (41), the "control module" (15) refuses to achieve the copy by destroying the resulting files from the analysis (42) and (45); and, possibly, alerts the user by requesting to the "user interface module" (11) or initiates a safety action: alarm, capture of the original. . . . If a "marking" has been detected and coherent "rules" have been read, the control module processes these "rules" and achieves the corresponding processes. If the copy (43) must be produced and the original is a "sensitive document", the "control module" (15) builds the new "rules" (46) associated with the document to be produced (43) and passes the hand to the "creation module" (17). This module (17) builds from the basis digitized document (44) and from the new "rules" (46) an image under the form of a digitized document (47) of the document to be produced (43) including the actual document, the "marking" and the possible "rules" linked to this document; then the "printing module" builds the document to be produced (43) from this electronic modeling (47).

For the first recommended "marking" (fog of points), the "marking" search can be done in the following manner:

Searching coherent zones of the presented document, i.e. as a way of example the zones (202) and (203). For that, eliminating any white rectangular part of the document that has a width in elementary points ("dots") larger than a predefined width and similarly for the height (a part is considered as white when the density of present isolated points is less than a predetermined value), it results an elimination of the margins (204) and (205) in the case of the example of scheme 2. Any graphic element potentially belonging to an occurrence of "rules" (sign + or bar, within the recommendation) is considered as a "white part" within the present search.

From the resulting zone of the previous step, for example in the case of the example the parts (202) and (203), the potential surface is counted in elementary printing points of this whole zone. This gives a number NDOT. Any printing element characterized by the juxtaposition of several printing elementary points is searched in this zone; this is for example the case of a character, i.e. in the example of scheme 3, the characters equivalent to (207). The global surface in dots of these whole elements is counted, to get NUTIL. A new search permits the counting of all the printing isolated elementary points, to get NMARQ.

From the previous results, the marking density is computed by the formula D=NMARQ/(NDOT−NUTIL); this density is compared to the normalized density characterizing the "marking". The result of this comparison will be used as a diagnostic to define the sensitive or conventional nature of the presented document.

For the second recommended "marking" (pattern), a search is carried out on the whole document(210) to detect all the occurrences of bits of pattern (212) (in the example: a bit of pattern could be defined as an oblique bar with an elementary thickness and a length of at least 1 cm for example). According to the number of such found elements and their geographic distribution within the page, a diagnostic of normalized pattern presence can be done and consequently a diagnostic concerning the nature of "sensitive document" or "conventional document" of the presented page can be carried out.

For the third recommended "marking" (filet framing), a search is carried out on the whole page to identify all the characters (221) composing it. For each identified character, there is a checking whether said character has a framing by an elementary filet (222). If a document has more than a predetermined number of characters in the page having such a framing, the document is considered as a "sensitive document" and as a "conventional document" on the contrary.

If the document is considered as a "sensitive document" (further to the detection of a "marking"), any occurrence of "rule" is searched. For that, there is a search of the graphic identifier of "rules" (233) or (254) validated by the orientation bar (234) or (255). After detection of the heading (231) or (252) defined this way, the data (232) or (253) are searched. For that, at each elementary spacing, there is a detecting of the presence (235)/(255) or the absence (236)/(257) of bar. The complete detection permits to decrypt the encoding of the occurrence and possibly to validate it. If encoding integrity control values are defined (control binary total, for example), this validity is controlled. If several occurrences of "rules" are detected, their coherence is validated. If the encoded values are modulated by statistical values linked to the presented document, these statistical values are computed again to check the concordance of the read "rules" with the presented document.

If the document can be reproduced with constraint, the "control module" links up the processing resulting from the interpretation of the "rules" (45) of the document (41); said processing will include, as the case may be:

control requesting to the "user interface module" (11) of an authorization of the user (31) towards the access defined in the "rules", accounting the author's rights if the document is a "author's document"-type document, if the reproduction is authorized, fabricating from the "initial rules" (45) "final rules" (46) that are the "rules" associated with the document to be produced (43), requesting to the "creation module" (17) with possible transmission of guidelines for modification of the basis digitized document; these guidelines correspond to the interpretation of the "rules" of the initial document (41).

The "control module" (15) requests to the "printing module" (14) when the "creation module" (17) has completed the fabrication of the "final digitized document" (47).

In all the cases where the reproduction is not authorized (further to a diagnostic of the "analysis module" or after failed request of identification of the user (31) to the "user interface module" (11)), the "control module" possibly actuates the safety systems (alarm, capture of the original . . . ) and destroys in the device any internal element built from the initial document (41): "initial digitized document" (42), "initial rules" (45) and "basis digitized document" (44).

The "creation module" (17) builds the "final digitized document" (47) directly from the "basis digitized document" when the document to be reproduced (41) is a "conventional document"-type document. In the other cases, the final digitized document (47) is built from the "basis digitized document" (44), the "final rules" (46) and the possible modification guidelines transmitted by the "control module" (15); the "creation module" (17) introduces a new "marking" to these elements.

The device proposed for the implementation of the method to its use for a remote reproduction is materialized by a "document server" (1) that further includes modules used for the remote reproduction: the "communication module" (18) and the "output management module" (19).

When a user (31) requests to his "document server" (1) to transmit a document (41) to his correspondent via the remote "document server" (2) of this correspondent (32), said user (31) introduces his document (41) on his "document server" (1) as for a local copy; the two "document servers" (1) and (2) of the user (31) and the correspondent (32) are identical. The driving of the modules is achieved by the "control module" (15) of the concerned "document server". After the expression of the request via the "user interface module" (11) of the emitting "document server" (1), the "digitization module" (12) of the emitter (1) produces a document under digitized form (42). This document (42) is analyzed by the "analysis module" (16) of the emitter (1) according to the same principle than for obtaining a local copy. This module (16) on the emitter (1) produces, like in the case of the local operation, the basis digitized document (44) (excluding any "marking" and any "rule"), and the "initial rules" (45) linked to the original document (41). At this level, the "control module" achieves the same tasks of control, counting, fabrication of final "rules" (46), or fabrication of copy modification guidelines deriving from the operation of the initial "rules" (44) while checking that the document (41) can be remotely reproduced (according to informations contained in the "rules") and then carries out a request to the user (31) via the "user interface module" (11) of the emitting "document server" (1) for obtaining the identification of the receiving "document server" (2) and the identifier of the correspondent (32) towards the receiver(2) or any equivalent information. The identification of the "document server" (2) is either a phone number in case of a telephone-type link, or a computer network address in the case of the use of a computer link. The identifier of the correspondent (32) is the same than the one that allows a user to identify himself to the "document server" in the case of a local copy; this identifier, in the case of the chosen example, must be accompanied by a password (this is not necessary if the correspondent has other means of safe identification: magnetic badge or equivalent). If the remote copy is authorized, after providing by the user (31) of the identification of the receiver (2) and the identification of the correspondent (32) towards the receiver(2), the control module requests to the "communication module" (18) of the emitter (1) for transmitting to the receiver (2) the elements permitting the remote copy. The "communication module" (18) of the emitter (1) establishes a communication session with the communication Module (18) of the receiver (2) by using, depending on the case, either a telephone network, or a computer network (71). The basis digitized document (44), the final "rules" (45) and possibly the guidelines of modification of the copy versus the original, are transmitted through this communication; this is completed by the identifier of the correspondent (32) towards the receiver (2). Further to this reception, the "control module" (15) of the receiver (2) requests to the "creation module" (17) of the receiver (2) for building on the receiver (2) the final digitized document" (47) from the "basis digitized document" (44) on the receiver (2) and the "final rules" (46) on the receiver (2) and possibly the guidelines of modification of the copy versus the original. The "final digitized document" (47) is then processed by the "output management module" (19) of the receiver (2) that stores it on a specific queue (non represented on the scheme) by linking to it the identifier of the correspondent (32) designed by the emitter user (31). For obtaining the desired copy, the correspondent (32) must identify himself to the receiver (2) via the "user interface module" (11) of the receiver (2) by seizing his identifier and his password (or depending on the case, by a magnetic badge or the like). Further to this identification, all the documents received on the receiving "document server" (2) and linked to the identified correspondent (32) are listed. Then the correspondent (32) frees the document(s) that he wishes to obtain, in this case, the "output management module" (14) of the receiver sends back the corresponding document(s) of his queue to the "printing module" (14) of the receiver (2) in order to obtain the desired copy(ies) (43). If management tasks are necessary concerning the provided copies of "sensitive documents", said tasks are done only at the moment of effective delivery of the document(s) (43).

The device proposed for the implementation of the method in its use for carrying out a printing from a computer system is materialized by a "document server" (1) that includes the same functional components than for the remote reproduction, and a "driver" (82) present on any computer system having to produce "sensitive documents". The computer user (33) conceives a document by means of the use of an application (81) resident on a computer system (72). The result of this conception is the image of the document under a digitized form (48). In fact, the result will be the image of the document under a descriptive form by the use of primitives of a page description language: in this case, an interpreting sub-module must be introduced either at the level of the computer system (72), or at the level of the "documents server" (1). For simplification aims, scheme 9 assumes the simplification hypothesis that the result of the application is a document under a digitized form. To send the document on the "document server" (1), a driver (82) is installed on the computer system (72). This driver permits to gather the elements required for establishing "rules" (49) associated with the document to be produced, either by an initial parametering, or by a dialogue with the user (33), or by a search of elements stored on the system (72), or by combination of these means. These "rules" are identical to those defined for a document normally derived from the device, only the encoded values being adapted to this new type of source. The set document (48) + "rules" (49) + identifier of the user (33) is transmitted to the "document server" (1) via a computer network (71) by use of the communication modules (83) then (18) of the two concerned systems. After reception of these elements ((48)(49) and identifier) on the "document server" (1), the "control module" (15) requests to the "creation module" (17) that produces the final document under a digitized form (47) from the received document (44) and the received "rules" (46). This document (47) is processed by the "output management module" (19) that stores it on a specific queue(non represented on the scheme) while linking to it the identifier of the user (33). The printing is freed only in presence of the user (33). To obtain the desired copy, the user (33) must identify himself to the "document server" (1) via the "user interface module" (11) by seizing his identifier and his password (or depending on the case, by a magnetic badge or the like). Further to this identification, all the documents received on the "document server" (1) and linked to the identified user (33) are listed. Then the user (33) frees the document(s) that he wishes to get, in this case, the "output management module" (19) sends back the documents(s) corresponding to its queue to the "printing module" (14) to obtain the desired printing(s) (43). The control of identifier/password can be done by request to the computer system (72). If management tasks are required concerning the provided printings of "sensitive documents", said tasks are done only at the moment of the effective delivery of the document(s) (43).

The proposed device for the implementation of the method to its use in the production of an original of a "authenticatable document" for carrying out a printing from a computer system, and, in the production of an authenticated paper copy from an original of a "authenticatable document", comprises a "document server" ((1) or (3)), a "driver" (82) present on any computer system having to produce "sensitive documents" and an "archiving server" (73). This latter (73) mainly includes a "communication module" (84) and an "archiving manager" (85). The "document server" (1) further includes, besides the previously defined functional modules, a "directory module" (20). The operation of this device is as follows:

When an entity desires to produce "authenticatable documents" (92), said entity defines on its computer system (72) via the application manager (34) the documents to be produced (48) and, according to the invention, the elements permitting a definition of the "rules" (49) of these documents. The document to be produced is directly built by an application (81). The rules are produced by a driver (82) according to the same operation than previously. When the document is ready to be produced, it is sent via a computer network (71) to the "document server" (1) for printing and to an "archiving server" (73) that stores the electronic image of the document (91) via a "archiving manager" (85). This manager (85) must be able to find every document from elements contained in the "rules", it also possibly carries out every access or memorizing management of the provided copies. The transmission is done from the computer system (72) via its respective communication module (83) to the "document server" (1) and the "archiving server" (73) via their respective communication module (18), (83) and (84). On the "document server" (1), the final document (92) is produced like in the previous characteristics via the possible control of a production manager (35). The produced document (92) is transmitted to his addressee (36) via the conventional transmission means by mail and the conventional means of circulation of paper documents. This addressee may be either the direct addressee addressed by the emitter (34) or an external organization to which this document will have been transmitted by the initial addressee of said document (for obtaining of any right). When the addressee (36) identified this way desires an authenticated copy of this document (92), he presents said document to his "document server" (3) while requiring to the user interface (11) an authenticated copy but not a conventional copy (However, the possibility of obtaining an authenticated copy does not prevent the user from requiring a conventional copy without authentication from an authenticatable original). The user may also present only an excerpt of the authenticatable original document in view of obtaining a copy of all or a part of the global document, in this case, he expresses in his request only the wish to obtain an authenticated copy while reserving the precise definition of the request when he will have complementary elements on the global document. Then the document (92) is digitized by the "digitization module" (12) of his "document server" (3) to get a digitized image (42) of this document (92). The analysis module (16), after detection of the marking, analyses the "rules" according to the previously defined process. From the result of this analysis, the "rules" are transcript under an exploitable form (45) without obtaining an actual image of the document (43). The "control module" (15) makes a request to the "directory module" (20) in order to obtain the electronic address of the "archiving server" (73) associated with the computer system (72) having produced the initial document. In the case of a failure for this request, the operation is stopped with a corresponding message at the level of the user interface (11) in order to make the emitting organization being registered on the device by the authorized person. When the "directory module" (20) sends back the electronic address, the "control module" (15) sends said address accompanied by suitable references of the document to the "communication module" (18) in order to get an authenticated copy of the document. If the presented document is only an excerpt of the global document from which the user wants to more precisely define the desired copy (the excerpt of the copied document may diverge from the presented excerpt), the "archiving server" (73) sends back in a first time all the elements necessary to the document server (3) to permit the user to complete his copy request (detailed summary, reproduction cost for author's right . . . ). When the request is definitely expressed, the archiving server (73) searches via its manager (85) the electronic image (91) of the corresponding document (92) or defined from this latter. If the production of the required copy is associated with the payment of author's rights, the corresponding management is achieved by the "archiving manager" (85) of the "archiving server" (73). The communication is done via a computer network (71) by use of the respective "communication modules" (18) and (84). The "document server" (3) receives the electronic image of the document (91), allowing said "document server" to store both the digitized image of the actual document (46) and the "associated rules" (44) possibly adapted to the nature of copy of the document to be produced. Then the "creation module" (17) produces the digitized document under is final form (47) from the digitized image of the document (46) and the "final rules" (44). The authenticated copy (93) is produced from this element (47) by the "printing module" (14) via possibly the "output management module" (14).

The proposed device for the implementation of the method in the production of an authenticated electronic copy or the carrying out of an authenticated electronic transaction (i.e. under the control of the emitter of the document used for the transaction) from an original of an "authenticatable document" (92) comprises a "document server" (3), an "archiving server" (73) and a "processing module" (87) on any computer system having to receive the electronic copy or register the electronic transaction. The "document server" (3) and the "archiving server" (73) are identical to their previous definition, the "driver" (82) is not used in the present example.

The user (36) can request to obtain from an "authenticatable document" (92) under paper form, an electronic authenticated copy (94) or even an electronic transaction (95) associated with the presented document. The process is identical to the obtaining of an authenticated paper copy, but in this case, the "document server" (3), after analyzing the document (92) and obtaining the corresponding "rules" (42) as previously, requests to the "communication module" (18) after a request to the "directory module" (20) in order to have the concerned "archiving server" (73) directly sending the electronic image (91) of the presented document (92) to the computer system (74) indicated by the user (36). The transfer from the "archiving system" (73) to the receiving computer system (74) is done by the use of a computer network (71) via the use of the respective communication modules (84) and (86). The "archiving manager" (85) manages for the emitter of the original document the produced copies (94) or the generated transactions (95). A "processing module" (87) present on any receiving computer system (74) permits the storage and management in said system of the authenticated electronic copy (94) and the generation of elements (95) corresponding to the generated transaction (possibly) from the presented original (92).

The present invention can be used, according to its characteristics, within a same entity to guarantee a secured flow of the paper documents. A company, being equipped with the described devices, to the exclusion of any other document production or reproduction apparatus, is ensured that, within said company, no sensitive document will be printed in view of a non-authorized third person. In the same way, it will not be possible to locally reproduce or fax the document within the entity. The hacking of "sensitive documents" then involves a substitution of the document, which compels the hacker to take risks and leave marks of his hacking. If the invention becomes a norm for document-production or reproduction, it will permit to avoid the identical copy of valuable documents (bank note, ticket . . . ) and to ensure to the producers of documents a remuneration for every diffusion or copy of their works.

For every company brought to print documents opening rights (administrative, accounting documents, or documents associated with transactions), and for the companies registering the corresponding rights, using the device at the emission permits the use of an ordinary paper to the exclusion of any complex technology, while spoiling any falsification attempt since said falsification is ineffective on the generated transaction. Thus, it is for example possible to transform an emitted check into a transfer if the banks are equipped with an adapted device, to collect the restaurant-tickets, to process the additional reimbursements from the mutual funds in relation to the social security statements, to register, for the accountants or tax controllers, pay slips, invoices or any accounting document. For imposing documents, stapled or bound, the user can obtain an entire copy without breaking the presented document, just by presenting one page of the document (if authorized by the emitter). The emitter can keep an entire control of the documents that he produces, as well as of the reproductions or transactions obtained from these documents, or even perceive author's rights on any copy produced from the emitted original.

I claim:

1. Method of document reproduction and management comprising the steps of first placing graphic marking and rules elements on documents considered sensitive;

said marking element enabling said sensitive documents to be distinguished from non-sensitive documents and comprised of a particular graphic element that does not affect document legibility but which is detectable, said marking element being present only on documents considered a sensitive document and absent from all other documents;

said rules elements being placed on all of said sensitive documents; and define requirements for and restrictions on reproduction of said documents; and include reference and identification elements of the documents; these rules elements allow information on options for reproduction and actions that the reproduction and management device must carry out when the document is presented for copying; said rules elements supplement the marking elements; where a document without marking elements has no rules elements, and a document having marking elements must have rules elements; the rules elements being coded on the document using a technique that minimizes impairment of the legibility of the document itself; where the rules elements authorize reproduction of the document but with alteration of the original, the alteration instruct ions are included in the rules using appropriate wording;

and subsequently carrying out the following steps:

(a) initialization by a user, by presenting a request for definition of a reproduction job (101) to be done on the original document;

(b) presentation (102) of the original document to be reproduced;

(c) numbering (103) the original document presented and converting said document into a logical element;

(d) searching (104) to detect the presence or absence of a marking element on the logical image of said document to be reproduced, and generating therewith a YES logical value when the document to be reproduced is a sensitive document, while the absence of detection of a marking element on this document generates a NO logical value indicating that said document is a non-sensitive document; said logical values determining the following sequence of steps:

(e) if a mark identifying the document to be reproduced as non-sensitive is absent, then the initial reproduction request is made (105) on the document;

(f) if the document to be reproduced is identified as a sensitive document, having a marking element, then making an analysis (106) to search for and decrypt the rules elements; the result of this step is a YES logical output if valid rules are detected in the processed document and a NO logical value output if the document has no rules elements and in the case where the document has invalid rules elements;

(g) if the result of the previous step (f) is a logical NO: rejecting (107) the request, and possible triggering of security measures;

(h) if the result of the previous step (f) is a YES logical value: interpreting (108) the rules and controls for authorizing the request taking into account the elements defined in the rules elements on the document and the user's request; the result of this step is a logical NO value if the request expressed is not authorized, bringing about rejection (107) of the request, and a YES logical value if the request is authorized;

(i) if the result of the previous step (h) is a YES logical value, then processing (109) the request on the sensitive document; the digitized image of the document to be reproduced being generated as a function of the instructions emerging from the nature of the request and operation of the sensitive document rules, elements and parallel management of in situ or remote archiving for monitoring the reproduction operations carried out, possibly in combination with additional elements furnished by the user, and;

(j) execution (110) of the request: the document, in its digitized form, may be converted into a paper document.

2. Method according to claim 1, wherein said marking element appears throughout the document.

3. Method according to claim 1, wherein when the document has several pages, each page of said document is provided with a marking element and each page is processed separately.

4. Device for implementing the method according to any one of the foregoing claims, forming a document server, comprising the following functional modules:

a user interface module (11) enabling the user to define his request and to identify himself, a digitizing module (12) converting the paper document to be reproduced into a logical element to enable the document presented to be computer-processed, an execution module (14) establishing the copy defined by the user request, based on the corresponding data-processing elements, when this is authorized, an analysis module (16), a control module (15), and a creation module (17) which are data-processing modules:

the analysis module having built-in algorithms designed to detect and decrypt the marking element and the rules elements from the digitized document;

the control module managing all the modules and their cohesiveness and initiating reproduction of the document;

the creation module composing the digitized image of the authenticated document to be reproduced, when reproduction is authorized, from the digitized image of the original document without its marking and its rules, abiding by the modification instructions contained in the rules elements of the original; and the document thus constituted having its own marking element and its own rules elements.

5. Device according to claim 4, further comprising:

a communication module (18) for enabling two identical document servers (1) to dialogue and exchange any computer file necessary for document reproduction; and an output management module (19) which is a computer module activated when the copy requested results from a request outside the document server producing the copy and which places a hold on the document to be produced, releasing it only when the recipient has identified himself to the receiver document server producing the document.

6. Device according to claim 5, further comprising a driver (82) provided on all computer systems (72) that print sensitive documents, said driver having the function of transmitting to the communication module (18) of the document server (1) all the files and characteristics necessary for constituting the desired document.

7. Device according to claim 6, comprising an archiving server (73) including a communication module (84) and an archiving manager (85), said archiving server (73), when an authenticatable document (92) is produced, storing its computerized equivalent (91) in order to restore it when a request to produce an authenticated copy from this authenticatable document is requested, and in that said document server (1-3) has a directory module (20) that manages accesses from any document server to any archiving server.

8. Device according to claim 7, comprising a processing module (87) built into any computer system (74) that is to receive a copy or an authenticated transaction executing a request expressed on a document server, on presentation of an authenticatable document and a prompt from the archiving server (73) attached to the document presented.

9. The method according to claim 1 wherein the marking element is detectable even from a small portion of the document.

* * * * *